(12) United States Patent
Matsushita (10) Patent No.: US 8,935,026 B2
(45) Date of Patent: Jan. 13, 2015

(54) VEHICLE CONTROL SYSTEM

(75) Inventor: Masanori Matsushita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 259 days.

(21) Appl. No.: 13/564,719

(22) Filed: Aug. 2, 2012

(65) Prior Publication Data

US 2013/0054062 A1 Feb. 28, 2013

(30) Foreign Application Priority Data

Aug. 31, 2011 (JP) ................................. 2011-188876

(51) Int. Cl.
| | | |
|---|---|---|
| B60T 10/00 | (2006.01) | |
| B60W 10/08 | (2006.01) | |
| B60K 6/448 | (2007.10) | |
| B60W 10/188 | (2012.01) | |
| B60W 20/00 | (2006.01) | |
| B60W 30/184 | (2012.01) | |
| B60W 30/18 | (2012.01) | |

(52) U.S. Cl.
CPC ............... B60W 10/08 (2013.01); B60K 6/448 (2013.01); B60W 10/188 (2013.01); B60W 20/00 (2013.01); B60W 30/1843 (2013.01); B60W 30/18118 (2013.01); B60W 2510/087 (2013.01); B60W 2510/182 (2013.01); B60W 2520/06 (2013.01); B60W 2710/083 (2013.01); Y02T 10/6243 (2013.01)

USPC ................................. 701/22; 475/5

(58) Field of Classification Search
USPC ............... 701/22; 475/4–5; 477/3, 4, 7, 9, 20, 477/24–29; 180/65.1, 65.26, 65.21, 65.285, 180/65.275–65.31
See application file for complete search history.

(56) References Cited

U.S. PATENT DOCUMENTS 5,457,363 A * 10/1995 Yoshii et al. .................. 318/432
8,579,759 B2 * 11/2013 Akebono et al. .................. 477/5

FOREIGN PATENT DOCUMENTS

| JP | 3923451 B2 | 2/2005 |
|---|---|---|
| JP | 2009-232485 | 10/2009 |

* cited by examiner

Primary Examiner — Dalena Tran
(74) Attorney, Agent, or Firm — Mori & Ward, LLP (57) ABSTRACT

A vehicle control apparatus includes an electric motor, a source power supply circuit, an electric motor controller, a brake device, a brake controller, a stall determination device, a temperature detector, and a backward-rolling detector. The backward-rolling detector is configured to detect whether a vehicle is rolling backward. If rolling backward of the vehicle is detected by the backward-rolling detector while a brake torque instruction value is being generated, the brake torque instruction value is corrected so that the vehicle stops rolling backward.

5 Claims, 7 Drawing Sheets

VEHICLE CONTROL SYSTEM

CROSS-REFERENCE TO RELATED APPLICATIONS

The present application claims priority under 35 U.S.C. §119 to Japanese Patent Application No. 2011-188876, filed Aug. 31, 2011, entitled "Vehicle Control Apparatus." The contents of this application are incorporated herein by reference in their entirety.

BACKGROUND OF THE INVENTION

1. Field of the Invention

The present technology relates to a vehicle control system.

2. Discussion of the Background

In existing vehicles capable of traveling using only the driving force of an electric motor (such as hybrid motor vehicles), if, for example, the vehicles do not start moving on an uphill although the accelerator pedal is ON, that is, if the vehicles enter a stall mode, an electric current may continuously flow in a particular one of a plurality of switching elements of an inverter. Thus, the risk of overheat of the switching element increases. Accordingly, the following technique has been developed (refer to, for example, Japanese Unexamined Patent Application Publication No. 2009-232485). That is, the temperature of the switching element is detected. If the temperature of the switching element is higher than or equal to a threshold value, the driving force of the electric motor is replaced by a mechanical braking force of a brake system. In this way, the temperature of the switching element can be decreased. Thus, failure or malfunction of the inverter can be prevented. In addition, the vehicle can be prevented from rolling backward on the uphill.

For hybrid vehicles having front wheels driven by an internal-combustion engine and rear wheels driven by an electric motor, the following technique has been developed (refer to, for example, Japanese Patent No. 3923451). That is, if the rear wheels rotate in an opposite direction, a mechanical braking force is generated using a brake system in order to reduce a thermal load imposed on the electric motor. In addition, the driving force of the internal-combustion engine is reduced, and the vehicle is stopped.

SUMMARY OF THE INVENTION

According to one aspect of the present invention, a vehicle control system includes an electric motor, a source power supply circuit, an electric motor, a brake device, a stall determination device, a temperature detector, and a backward-rolling detector. The electric motor is configured to generate a driving force in a vehicle. The source power supply circuit is configured to supply electric power to the electric motor. The electric motor controller is configured to control an output torque of the electric motor via the source power supply circuit in accordance with a motor torque instruction value. The brake device is configured to generate a braking force that mechanically decelerates a wheel of the vehicle. The brake controller is configured to control the braking force generated by the brake device in accordance with a brake torque instruction. The stall determination device is configured to determine whether the vehicle is in a stall mode in which the vehicle is stationary although the driving force generated by the electric motor is being transferred to a drive wheel of the vehicle. The temperature detector is configured to detect a temperature of the source power supply circuit. The motor torque instruction value is generated so that the output torque of the electric motor is decreased and the brake torque instruction value is generated so that the braking force generated by the brake device is increased by a braking force that is substantially equivalent to a decrease in the output torque of the electric motor, if the stall determination device determines that the vehicle is in the stall mode and if the temperature of the source power supply circuit detected by the temperature detector is higher than a predetermined value. The backward-rolling detector is configured to detect whether the vehicle is rolling backward. The brake torque instruction value is corrected so that the vehicle stops rolling backward if rolling backward of the vehicle is detected by the backward-rolling detector while the brake torque instruction value is being generated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
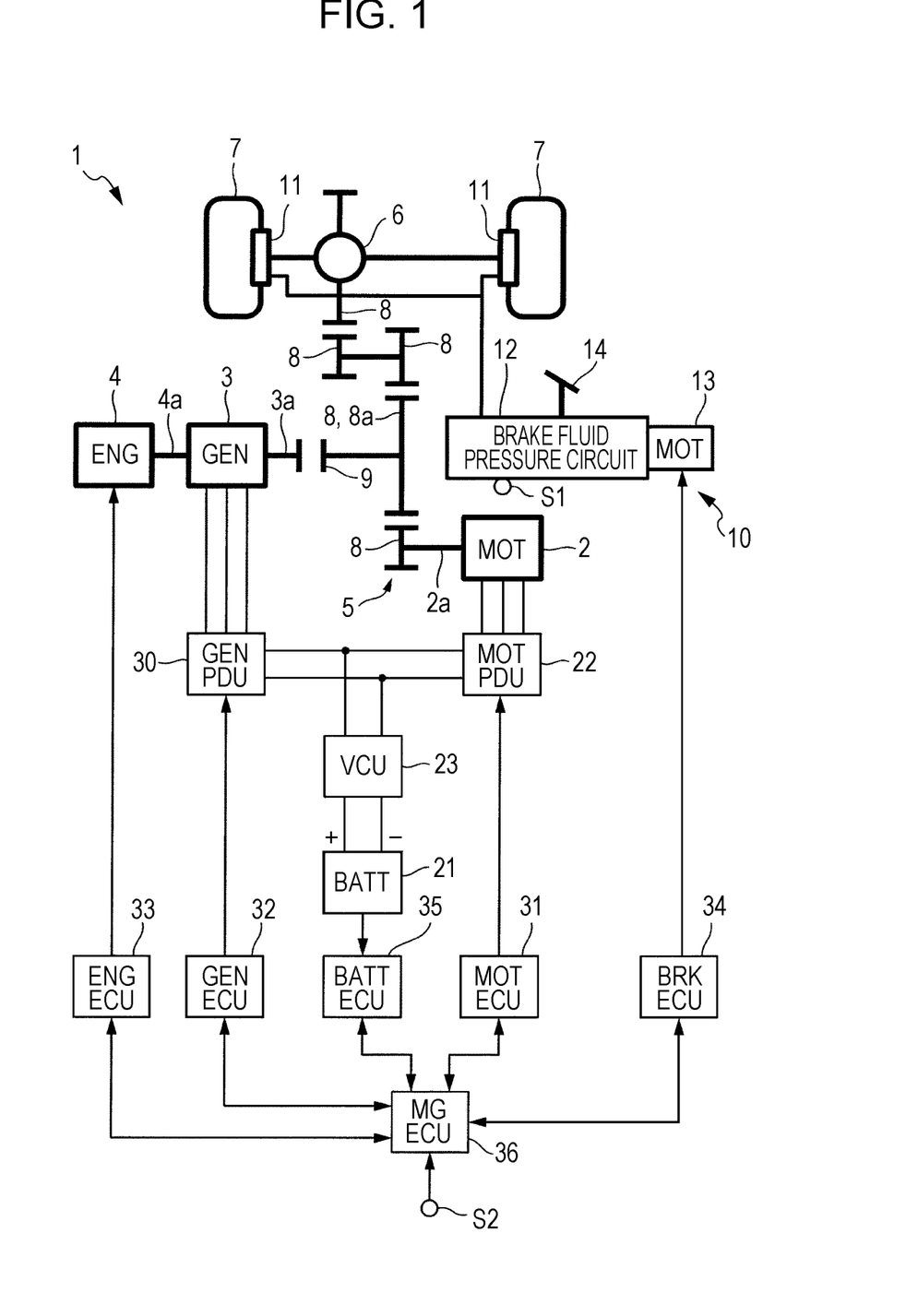
FIG. 1 is a schematic illustration of the system configuration of an electric vehicle according to an exemplary embodiment of the present technology.

A brake control device of a vehicle according to a first exemplary embodiment of the technology is described below with reference to the accompanying drawings. As illustrated in FIG. 1, according to the present exemplary embodiment, an electric vehicle 1 (hereinafter also simply referred to as a "vehicle 1") includes an electric motor 2 serving as a source of driving power of the vehicle 1, a generator 3, and an engine 4 that drives the generator. Note that according to the present exemplary embodiment, the engine 4 can also be used as a source of driving power of the vehicle 1. That is, according to the present exemplary embodiment, the vehicle 1 is an electric vehicle capable of operating as a series hybrid vehicle and a parallel hybrid vehicle.

The electric motor 2 includes a rotation shaft 2a that rotates together with the rotor (not illustrated) of the electric motor 2. The rotation shaft 2a is coupled with a pair of wheels (drive wheels) 7 via a power transmission mechanism 5 and a differential gear mechanism 6. Thus, the power is transferred between the electric motor 2 and the wheels 7 via the power transmission mechanism 5 and the differential gear mechanism 6. In such a case, according to the present exemplary embodiment, the power transmission mechanism 5 includes a plurality of gears 8. Note that the power transmission mechanism 5 may include a transmission, such as a continuously variable transmission (CVT).

The generator 3 and the engine 4 are disposed so as to be coaxial. The generator 3 includes a rotation shaft 3a that rotates together with a rotor (not illustrated) of the generator 3. In addition, the rotation shaft 3a is coupled with an output shaft (a crankshaft) 4a of the engine 4 so as to rotate together with the output shaft of the engine 4. Furthermore, an end of the rotation shaft 3a of the generator 3 protruding toward the opposite side from the engine 4 is coaxially coupled with a gear 8a, which is one of the gears of the power transmission mechanism 5, via a clutch mechanism 9. The clutch mechanism 9 is operable so as to switch between a disconnection mode in which power transfer between the rotation shaft 3a and the gear 8a is disabled and a connection mode in which the power transfer is enabled.

In this case, if the clutch mechanism 9 enters a connection mode, the power of the engine 4 can be transferred from the output shaft 4a to the wheels 7 via the rotation shaft 3a of the generator 3, the clutch mechanism 9, the power transmission mechanism 5, and the differential gear mechanism 6. Accordingly, in this mode, for example, the engine 4 alone or together with the electric motor 2 can be used as a source of driving power of the vehicle 1. In addition, in this mode, the generator 3 can operate to generate electrical power as needed.

In contrast, if the clutch mechanism 9 enters a disconnection mode, power transfer between the output shaft 4a of the engine 4 (and the rotation shaft 3a of the generator 3) and the wheels 7 is disabled. Accordingly, in this mode, the generator 3 can operate to generate electrical power without transferring the power of the engine 4 to the wheels 7.

Note that the electric motor 2 can operate in a generator mode to generate and output electric power in addition to operating in a power running mode to generate drive torque when electric power is supplied to the winding wire of the armature of the electric motor 2. For example, when the vehicle 1 is decelerated, the electric motor 2 can operate in a generator mode (in a regenerative running mode) using the kinetic energy of the vehicle 1.

Similarly, the generator 3 can operate in a power running mode in addition to operating in a generator mode. For example, in order to start the engine 4, the generator 3 can operate as an engine starter motor for rotationally driving the output shaft 4a of the engine 4 by supplying electric power to the winding wire of the armature of the generator 3.

For example, the electric motor 2 and the generator 3 are formed from a three-phase synchronous machine including a permanent magnet serving as a rotor.

According to the present exemplary embodiment, the vehicle 1 further includes a brake system 10 that generates a mechanical braking force (braking power using a friction force) exerted on the wheels 7. The brake system 10 is an electric braking system including a braking force applying unit 11 that applies a brake torque generated by a brake fluid pressure to the wheels 7, a brake fluid pressure circuit 12 that can generate the brake fluid pressure delivered to the braking force applying unit 11 using a motor cylinder (a cylinder driven by an electric motor) (not illustrated), and an electric motor 13 that drives the motor cylinder (hereinafter referred to as a "brake motor 13"). Note that in FIG. 1, the wheels 7 having the braking force applying unit 11 attached thereto are two drive wheels. However, in addition to the two drive wheels, the other wheels (not illustrated) have the braking force applying unit 11 attached thereto.

Existing structures can be applied to the braking force applying unit 11 and the brake fluid pressure circuit 12 of the brake system 10. Accordingly, the structures are not described and illustrated in detail. Briefly, for example, the braking force applying unit 11 has a structure that generates a friction force serving as a braking force of the wheels 7 between a brake disc rotatable together with each of the wheels 7 and a brake pad by urging the brake pad against the brake disc.

In addition, the brake fluid pressure circuit 12 may have a structure that has been proposed by the present inventor. The structure is described in Japanese Unexamined Patent Application Publication No. 2005-343366, the entire contents of which are incorporated herein by reference. In such a case, the brake fluid pressure circuit 12 can generate brake fluid pressure delivered to the braking force applying unit 11 of each of the wheels 7 by using one of a master cylinder that operates simultaneously with the movement of a brake pedal 14 of the vehicle 1 and a motor cylinder driven by the brake motor 13 without using the movement of the brake pedal 14.

According to the present exemplary embodiment, the vehicle 1 has such a mechanism and configuration as described above.

An electrical configuration of the vehicle 1 is described next.

The vehicle 1 includes a battery (a secondary battery) 21 that stores source power to be supplied to, for example, the electric motor 2. The winding wire of the armature of the electric motor 2 is electrically connected to the battery 21 via a power drive unit 22 (hereinafter referred to as a "motor PDU 22") that serves as an electric motor drive circuit and a voltage controller unit 23 (hereinafter referred to as a "VCU 23"). The motor PDU 22 includes an inverter circuit 24 (described in more detail below). The VCU 23 is formed from, for example, a DC/DC converter. Thus, electric power can be transferred between the electric motor 2 and the battery 21 via the motor PDU 22.

Figure 2:
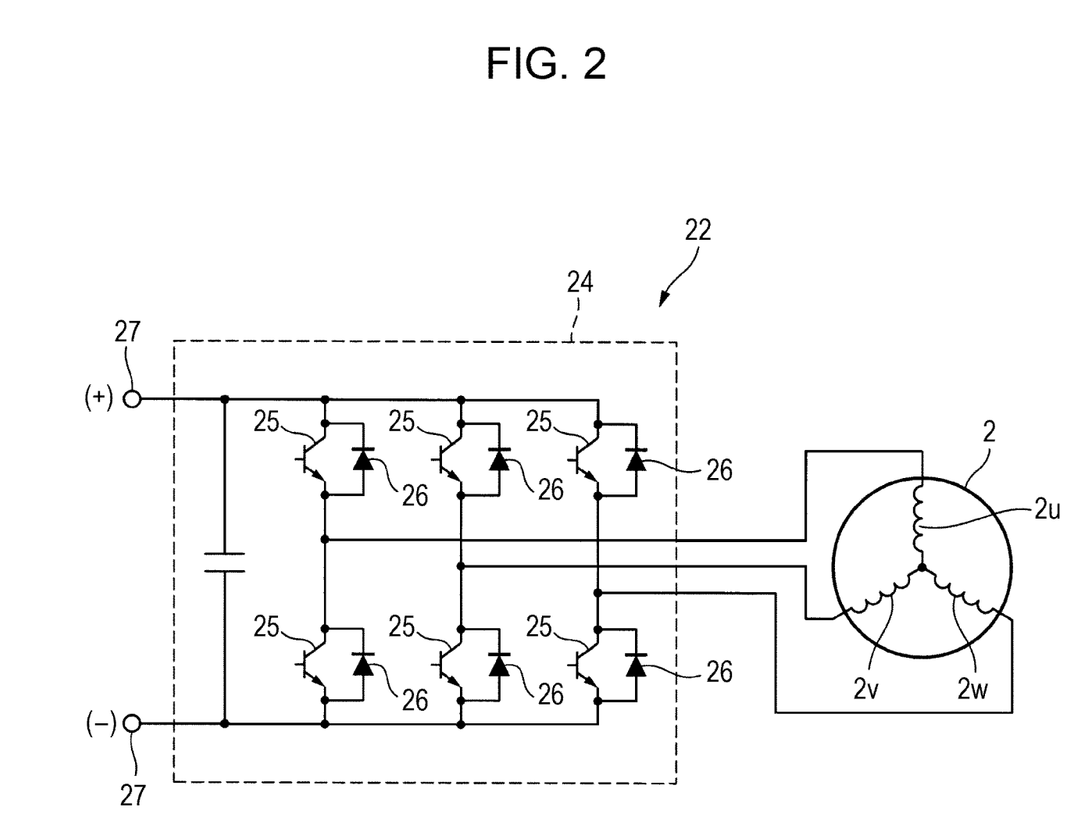
FIG. 2 illustrates an exemplary circuit diagram of a main part of a motor PDU illustrated in FIG. 1.

FIG. 2 illustrates an exemplary circuit diagram of the inverter circuit 24 of the motor PDU 22. An existing three-phase inverter circuit is used as the inverter circuit 24. The inverter circuit 24 includes three arm units for three phases, namely, a U phase, a V phase, and a W phase each including two semiconductor switching elements 25 connected in series and two diodes 26 connected to the semiconductor switching elements 25 in parallel, respectively. The arm units for three phases are connected in parallel between two electric source terminals 27 to which the power voltage for the electric motor 2 is applied. Each of the semiconductor switching elements 25 is formed from, for example, an insulated gate bipolar transistor (IGBT).

The middle points of the U-phase arm unit, the V-phase arm unit, and the W-phase arm unit of the inverter circuit 24 are connected to a U-phase winding wire of the armature 2u, a V-phase winding wire of the armature 2v, and a W-phase winding wire of the armature 2w of the electric motor 2, respectively.

In such a case, when the electric motor 2 is in a power running mode and if the semiconductor switching elements 25 are controlled to be switched ON/OFF at a certain time in accordance with the rotation of the rotor of the electric motor 2, direct-current (DC) power supplied between the two electric source terminals 27 from the VCU 23 from the battery 21 is converted into three-phase alternating current (AC) power. The AC power is supplied to the U-phase winding wire of the armature 2u, the V-phase winding wire of the armature 2v, and the W-phase winding wire of the armature $2w$ of the electric motor 2. In this way, the electric motor 2 operates in the power running mode.

In contrast, when the electric motor 2 is in a generator mode (a regenerative running mode) and if the semiconductor switching elements 25 are controlled to be switched ON/OFF at a certain time in accordance with the rotation of the rotor of the electric motor 2, three-phase AC power generated by the U-phase winding wire of the armature $2u$, the V-phase winding wire of the armature $2v$, and the W-phase winding wire of the armature $2w$ of the electric motor 2 is converted into DC power. The DC power is supplied from the electric source terminals 27 to the battery 21 (i.e., the battery 21 is recharged). In this way, the electric motor 2 operates in the generator mode (the regenerative running mode).

Referring back to FIG. 1, the generator 3 is electrically connected to the battery 21 via a power drive unit 30 (hereinafter referred to as a "generator PDU 30") having a configuration that is the same as that of the motor PDU 22 and the VCU 23. In addition, like the electric motor 2, semiconductor switching elements of an inverter circuit of the generator PDU 30 are controlled to be switched ON/OFF, electrical power is transferred between the generator 3 and the battery 21 via the power drive unit 30. Thus, the generator 3 can operate in the generator mode or in the power running mode.

Furthermore, the vehicle 1 includes a motor ECU 31, a generator ECU 32, an engine ECU 33, a brake ECU 34, a battery ECU 35, and a management ECU 36. The motor ECU 31 serves as a control unit that controls driving of the electric motor 2 (power supply control) via the motor PDU 22. The generator ECU 32 serves as a control unit that controls driving of the generator 3 (power supply control) via the generator PDU 30. The engine ECU 33 serves as a control unit that controls driving of the engine 4 via a throttle valve actuator, a fuel injection device, and an ignition device (none are shown) of the engine 4. The brake ECU 34 serves as a control unit that controls driving of the brake system 10 (control of the brake fluid pressure supplied to the braking force applying unit 11) using the brake motor 13. The battery ECU 35 serves as a control unit that monitors the conditions of the battery 21 (e.g., a battery level). The management ECU 36 serves as an upper-level control unit that controls the motor ECU 31, the generator ECU 32, the engine ECU 33, the brake ECU 34, and the battery ECU 35. Each of the motor ECU 31, the generator ECU 32, the engine ECU 33, the brake ECU 34, the battery ECU 35, and the management ECU 36 is formed from an electronic circuit unit including a central processing unit (CPU), a random access memory (RAM), and a read only memory (ROM).

The motor ECU 31, the generator ECU 32, the engine ECU 33, the brake ECU 34, the battery ECU 35, and the management ECU 36 can send data to and receive data from each another. The management ECU 36 generates instruction data used to determine the operations of the electric motor 2, the generator 3, the engine 4, and the brake system 10 on the basis of data received from the motor ECU 31, the generator ECU 32, the engine ECU 33, the brake ECU 34, and the battery ECU 35 (data indicating the drive conditions of the electric motor 2) and detection data of a variety of sensors of the vehicle 1. Thereafter, the management ECU 36 sends the instruction data to the motor ECU 31, the generator ECU 32, the engine ECU 33, and the brake ECU 34.

At that time, the motor ECU 31, the generator ECU 32, the engine ECU 33, and the brake ECU 34 control the operations of the electric motor 2, the generator 3, the engine 4, and the brake system 10 on the basis of the received instruction data, respectively.

According to the present exemplary embodiment, in order to perform the control process of the technology, the management ECU 36 receives a position AP of an accelerator pedal (hereinafter referred to as an "accelerator pedal position AP"), a vehicle speed VP, a temperature Tig of the semiconductor switching elements 25 of the inverter circuit 24 of the motor PDU 22 (hereinafter referred to as an "inverter switching element temperature Tig"), and the detection data of a brake fluid pressure PMCX supplied to the braking force applying unit 11 from appropriate sensors (or one of the motor ECU 31, the generator ECU 32, the engine ECU 33, and the brake ECU 34). In addition, the management ECU 36 receives an estimated value SLP of the slope of a road on which the vehicle 1 travels computed by a slope estimator (not illustrated) (hereinafter referred to as an "estimated road slope value SLP"). Furthermore, the management ECU 36 receives the value of the oil temperature of the brake fluid pressure circuit 12 detected by an oil temperature sensor S1 and the value of an ambient temperature outside the vehicle 1 detected by an ambient temperature sensor S2. Still furthermore, the brake ECU 34 detects the wear level of the pad, and the management ECU 36 receives the detected wear level of the pad from the brake ECU 34.

In order to detect the wear level of the pad, the thickness of the pad is used as a typical parameter. As the thickness of the pad decreases, the wear level of the pad increases (the pad wear is more significant). The thickness of the pad can be directly measured by using, for example, a camera or an ultrasonic sensor. Alternatively, the thickness of the pad can be indirectly measured by measuring an electrostatic capacitance between plates forming the pad (the electrostatic capacitance of the pad). As the thickness of the pad decreases due to the wear from the thickness when new, the electrostatic capacitance of the pad more varies (increases). Accordingly, by obtaining the difference in electrostatic capacitance from the electrostatic capacitance when new, the thickness of the pad can be estimated.

The management ECU 36 performs a predetermined computing process using the above-described input data and generates a motor torque instruction value representing the instructed value of the output torque of the electric motor 2 and a brake torque instruction value representing the instructed value of the braking force generated by the brake system 10 for the vehicle 1. Thereafter, the management ECU 36 outputs the motor torque instruction value to the motor ECU 31 and outputs the brake torque instruction value to the brake ECU 34.

The inverter switching element temperature Tig indicates the temperature that is the highest among the temperatures of the semiconductor switching elements 25 of the inverter circuit 24 of the motor PDU 22 or the temperature of a predetermined portion of the motor PDU 22 substantially equivalent to the highest temperature of the semiconductor switching element 25.

The estimated road slope value SLP indicates the slope of a road estimated from the vehicle speed VP or a detection value of an acceleration α in the traveling direction of the vehicle 1 through an existing technique. For example, the estimated road slope value SLP can be computed using an air resistance Ra, a rolling resistance Rr, an accelerating resistance Rc, and a driving force required by the vehicle 1 (the value of a driving force required by the vehicle 1) in the following manner.

The air resistance Ra can be obtained as follows:

$$\text{air resistance } Ra = \lambda \times S \times VP2 \tag{1a}$$

where λ is the air resistance coefficient, and S is the front projection area of the vehicle 1. The rolling resistance Rr can be obtained as follows:

$$\text{rolling resistance } Rr = W \times \mu \tag{1b}$$

where W is the weight of the vehicle 1, and μ is the rolling resistance coefficient. The accelerating resistance Rc can be obtained as follows:

$$\text{accelerating resistance } Rc = \alpha \times W \tag{1c}$$

Finally, the estimated road slope value SLP can be obtained as follows:

$$\text{estimated road slope value SLP (rad)} = \{\text{vehicle requiring driving force} - (Ra + Rr + Rc)\} / (W \times g) \tag{1}$$

where g is the gravitational acceleration constant. Note that the vehicle requiring driving force in equation (1) is sequentially determined by the management ECU 36 for each predetermined computational cycle. The value computed for the previous computational cycle (the previous value) is used as the value of the vehicle requiring driving force. In addition, in equation (1), sin(SLP) is approximated by SLP (i.e., sin(SLP)≈SLP).

The estimated road slope value SLP may be computed by the management ECU 36.

An exemplary control process according to the present technology is described next. The management ECU 36 sequentially performs the processes in the flowcharts illustrated in FIGS. 3 and 4 for each computational cycle. In this way, the management ECU 36 generates the motor torque instruction value of the electric motor 2 and the brake torque instruction value of the brake system 10.

Figure 3:
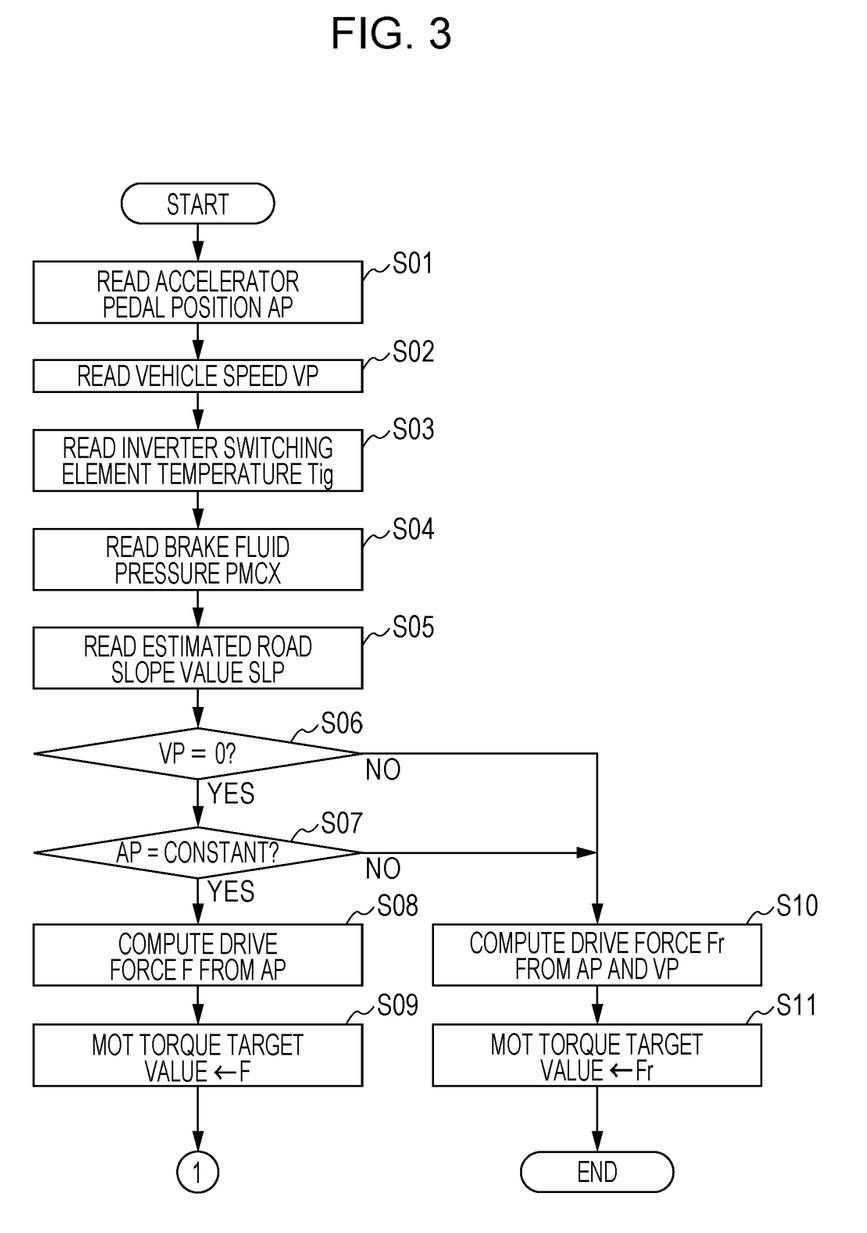
FIG. 3 is a flowchart of a control process performed by a management ECU illustrated in FIG. 1.

As illustrated in FIG. 3, in steps S01 to S05, the accelerator pedal position AP, the vehicle speed VP, the inverter switching element temperature Tig, the brake fluid pressure PMCX, and the estimated road slope value SLP are input. Note that the process for receiving the inverter switching element temperature Tig in step S03 corresponds to a temperature detecting unit of the technology.

In step S06, it is determined whether the detection value of the vehicle speed VP is "0" (more specifically, it is determined whether the detection value of the vehicle speed VP is in a predetermined range near "0"). If the determination is "No" (if VP≠0), that is, if the vehicle 1 is not completely stopped, the processes in steps S10 and S11 are performed. Thereafter, the processing performed for the current computational cycle is completed. In step S10, a driving force Fr (a driving force required by the vehicle 1) is computed from the accelerator pedal position AP and the vehicle speed VP. In this case, for example, the driving force Fr is determined using a map that prestores a relationship among the driving force Fr, the accelerator pedal position AP, and the vehicle speed VP. Note that more specifically, the driving force Fr is represented as a required value of a translation force to be exerted on the vehicle 1 in the traveling direction of the vehicle 1 (hereinafter, the same applies to the driving force F).

In step S11, the driving force Fr determined in step S10 is set to a torque target value of the electric motor (MOT) 2. The rotation of the electric motor 2 is controlled so that the torque of the electric motor 2 is the same as the torque target value. Thus, the driving force Fr is applied to the vehicle 1. The torque target value of the electric motor 2 can be obtained by multiplying the driving force target value, which is a target value of a driving force exerted on the vehicle 1, by the effective radius of the wheels 7 to obtain the total drive torque of the wheels 7 and dividing the drive torque by the reduction ratio of the power transmission system between the electric motor 2 and the wheels 7. Alternatively, the driving force Fr may be determined using the dimension of the required torque, which is the output torque of the electric motor 2 converted from the driving force Fr. In such a case, the driving force Fr can be directly used as the torque target value of the electric motor 2 and, therefore, the process performed in step S11 is eliminated.

However, if, in step S06, the determination is "Yes" (if VP=0), it is determined in step S07 whether the accelerator pedal position AP is constant (the accelerator pedal position AP≠0). If the determination is "No" (if AP is not constant), the processing proceeds to step S10 (described above). However, if the determination is "Yes" (if AP is constant), the processing proceeds to step S08. Note that determination as to whether the accelerator pedal position AP is constant or not can be made by, for example, determining whether the accelerator pedal position AP is within a predetermined range or not. The processes performed in steps S06 and S07 correspond to a stall determination unit of the present technology.

In step S08, the driving force F of the vehicle 1 is determined in accordance with the detection value of the accelerator pedal position AP. In this case, by searching the map used in step S10 for a value obtained when VP=0, the driving force F can be determined from the detection value of the accelerator pedal position AP. Note that the driving force F is equivalent to the driving force Fr. However, a force determined on the basis of the accelerator pedal position AP and the vehicle speed VP is referred to as a "driving force Fr". In contrast, a force determined on the basis of the accelerator pedal position AP is referred to as a "driving force F". In step S09, the driving force F determined in step S08 is set to the torque target value of the electric motor (MOT) 2. As in the above-described case, the torque target value of the electric motor 2 can be obtained by converting the driving force target value. The rotation of the electric motor 2 is controlled on the basis of the torque target value of the electric motor 2.

Through the processes performed from step S01 to step S11, if, in step S06, the determination is "Yes", that is, if the vehicle 1 is completely stopped or nearly stopped, the driving force F is set to non-zero value with the accelerator pedal position AP being constant, that is, the driving force F is set to a value used for generating a driving force. Consequently, according to the present exemplary embodiment, the mode resulted from the computation of the driving force F performed in steps S08 and S09 corresponds to the stall mode of the vehicle 1. The vehicle 1 enters the stall mode when the vehicle 1 is located on an uphill. Note that according to the present exemplary embodiment, an accelerator operation and a braking operation are not performed at the same time. If the accelerator pedal position AP is constant, the amount of a brake pedal operation is "0".

Figure 4:
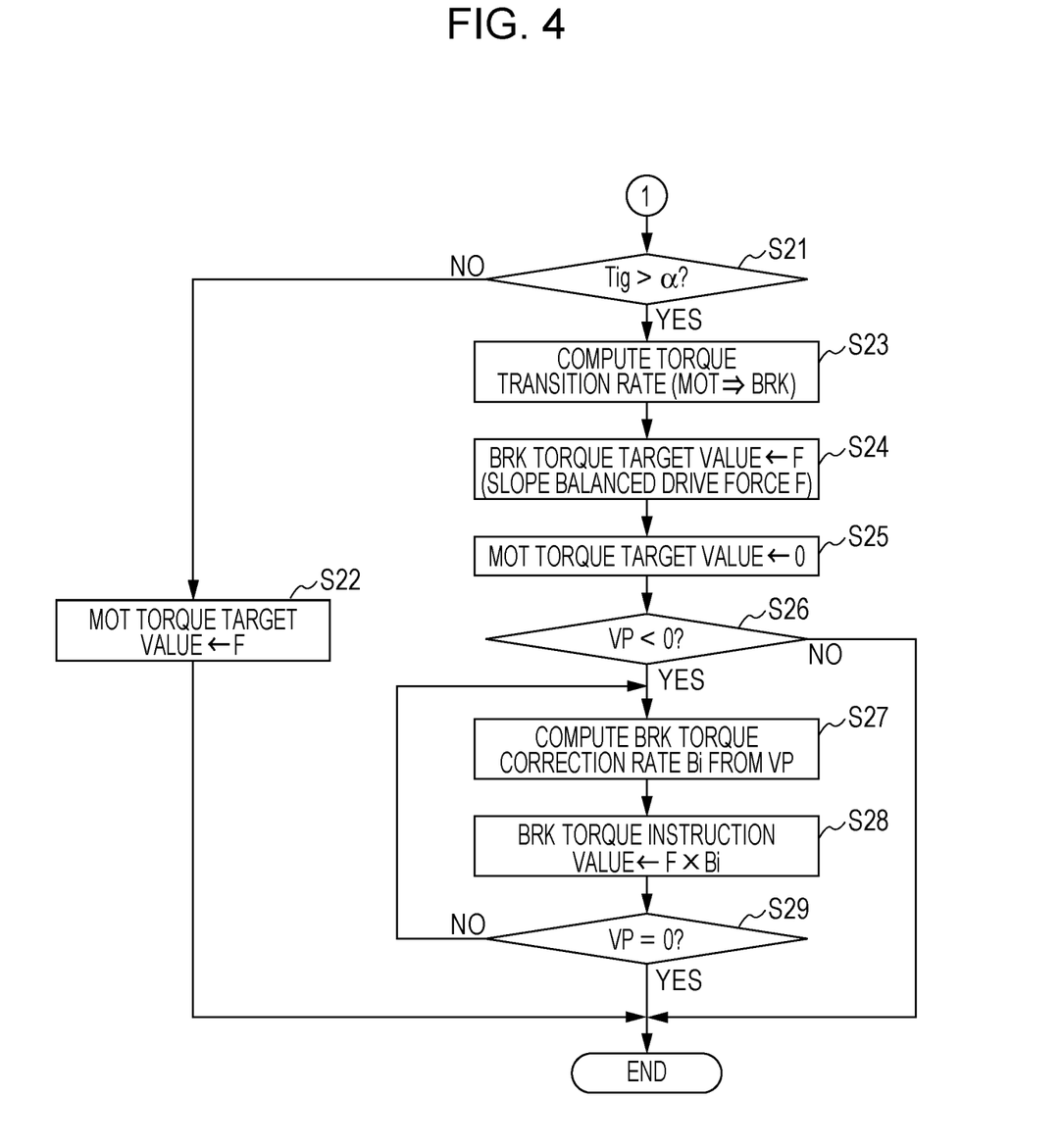
FIG. 4 is a continuation of the flowchart illustrated in FIG. 3.

In a stall mode of the vehicle 1, the management ECU 36 performs the above-described process in step S09 and starts the process of the flowchart illustrated in FIG. 4. In step S21, it is determined whether the inverter switching element temperature Tig is higher than the predetermined temperature α. The temperature α is a preset value that is slightly lower than the allowable upper limit temperature of the semiconductor switching elements 25 of the inverter circuit 24.

If, in step S21, the determination is "No" (if Tig>α), the processing proceeds to step S22. As in step S09, the driving force F obtained in step S08 is set to the torque target value of the electric motor 2. Thereafter, the processing performed for the current computational cycle is completed. However, if, in step S21, the determination is "Yes" (if Tig≤α), the processing proceeds to step S23, where a torque transition rate for increasing a braking force is set through computation.

The term "torque transition rate" refers to a target incremental value of the brake torque instruction value per unit time or a target decremental value of the motor torque instruction value per unit time used for preventing an increase in the temperature of an inverter switching element. According to the present exemplary embodiment, basically, the target incremental value of the brake torque instruction value per unit time is the same as the target decremental value of a drive instruction value of the electric motor 2 per unit time used for preventing an increase in the temperature of the inverter switching element. The value corresponds to the torque transition rate. The torque transition rate is set so as to decrease with an increase in the estimated road slope value SLP. In addition, the torque transition rate is set so as to increase with an increase in the inverter switching element temperature Tig.

In step S24, the driving force F of the vehicle 1 is set to a brake (BRK) torque target value. At that time, the driving force F has a value indicating a driving force that prevents the vehicle 1 from rolling backward on the uphill (i.e., a slope balanced driving force). That is, in order to cover the torque output from the electric motor 2 by the brake torque, the driving force F is converted into a brake torque (the output torque of the electric motor 2 is converted into a brake torque), and a brake torque target value is set. The brake torque instruction value is increased in accordance with the torque transition rate until the brake torque instruction value reaches the brake torque target value. More specifically, the current brake torque instruction value (the value to be used for the current computational cycle) is determined by adding a value obtained by multiplying the time of one computational cycle by the torque transition rate for increasing the braking force to the previous brake torque instruction value. Note that the current value of the driving force F of the vehicle 1 is determined as the brake torque target value, and the current brake torque instruction value is limited to less than the brake torque target value.

The current value of the driving force F of the vehicle 1 is equal to a driving force that cancels out a downhill force exerted on the vehicle 1 due to the force of gravity acting on the vehicle 1 (the driving force=the force of gravity×sin(the slope of the road)), when the vehicle 1 is located on an uphill slope. Accordingly, the brake torque target value is a minimal value of a braking force required for stopping the vehicle 1 on the uphill.

In step S25, the torque target value of the electric motor (MOT) 2 is set to "0". More specifically, the detection value of the brake fluid pressure PMCX is converted into its equivalent brake torque. Thus, an estimated value of the actual brake torque is obtained. Furthermore, the motor torque instruction value is determined from the estimated value of the actual brake torque and the current value of the driving force F so that the sum of the brake torque and the torque of the electric motor 2 equals to the driving force F. Note that at that time, the motor torque instruction value is determined so that the current motor torque instruction value is not smaller than "0". The conversion from the detection value of the brake fluid pressure PMCX into the brake torque is performed using a predetermined expression or using a data table.

In step S25, instead of the obtained brake torque, the brake torque instruction value determined in step S24 (the current value or the previous value) may be used to determine the motor torque instruction value. Alternatively, the motor torque instruction value may be determined so as to be decreased in accordance with a torque transition rate having the same absolute value as the torque transition rate determined in step S23 but the opposite sign (<0) (note that the motor torque instruction value≥0).

In step S26, it is determined whether the vehicle speed VP is less than "0". If the vehicle speed VP is less than "0", the vehicle 1 is rolling backward on an uphill slope. If the determination is "Yes" (if VP<0), the processing proceeds to step S27. However, if the determination is "No" (if VP≥0), the processing for the current computing cycle is completed. Note that the process performed in step S26 corresponds to a backward-rolling detecting unit.

In step S27, a correction rate Bi of the brake torque instruction value is computed on the basis of the vehicle speed VP. In step S28, a correction value is computed by multiplying the correction rate Bi by the current brake torque instruction value. The correction value is set as the brake torque instruction value.

In step S29, it is determined whether the vehicle speed VP is "0". If the determination is "No" (if VP≠0), the processing returns to step S27. However, if the determination is "Yes" (if VP=0), the processing for the current computing cycle is completed.

That is, in the processes from step S27 through step S29, although the brake torque instruction value is set to the brake torque target value that allows the vehicle 1 to remain stationary on an uphill slope, the vehicle 1 is rolling backward. Accordingly, the brake torque instruction value is increased until the vehicle 1 stops rolling backward. Note that at that time, the vehicle 1 rolls backward if the brake torque instruction value differs from the actual brake torque. This situation is caused by the brake conditions, such as the temperature of the brake pad, the friction coefficient of the pad, and the temperature of fluid (the oil temperature). In general, the brake torque is smaller than the brake torque instruction value. The actual brake torque output from the brake system 10 decreases as the temperature of brake oil and the ambient temperature outside the vehicle 1 increase. In addition, the actual brake torque output from the brake system 10 decreases as the wear level of the brake pad increases.

The correction rate Bi is used to correct the brake torque instruction value by, for example, being multiplied by the current brake torque instruction value. By using the brake torque instruction value corrected with the correction rate Bi, the brake torque can be increased until the vehicle speed VP becomes "0", that is, the vehicle 1 stops rolling backward. Note that the correction rate Bi may be obtained from, for example, a predefined table or map indicating a relationship between the vehicle speed VP and the correction rate Bi.

According to the present exemplary embodiment, the management ECU 36 performs such processing that has been described above in detail (i.e., the processing according to the present technology).

The motor torque instruction value and the brake torque instruction value determined through the processing performed by the management ECU 36 in the above-described manner are provided to the motor ECU 31 and the brake ECU 34, respectively. At that time, the motor ECU 31 determines a target value of an electric current flowing through the winding wire of the armature of the electric motor 2 in accordance with the provided motor torque instruction value and the detection value of the rotational speed of the rotor of the electric motor 2. Thereafter, the motor ECU 31 determines a control instruction used for switching on/off of each of the semiconductor switching elements 25 of the inverter circuit 24 of the motor PDU 22 so that the detection value of an electric current flowing through the winding wire of the armature of the electric motor 2 is the same as the determined target value. The motor ECU 31 controls the motor PDU 22 in accordance with the control instruction. In this way, the motor ECU 31 controls the electric current flowing through the winding wire of the armature of the electric motor 2 and, thus, controls the output torque of the electric motor 2 in accordance with the motor torque instruction value.

The brake ECU 34 determines a target value of the brake fluid pressure PMCX to be generated by the motor cylinder of the brake system 10 in accordance with the provided brake torque instruction value. Thereafter, the brake ECU 34 controls the operation performed by the brake motor 13 so that the target value of the brake fluid pressure PMCX is reached.

Figure 5:
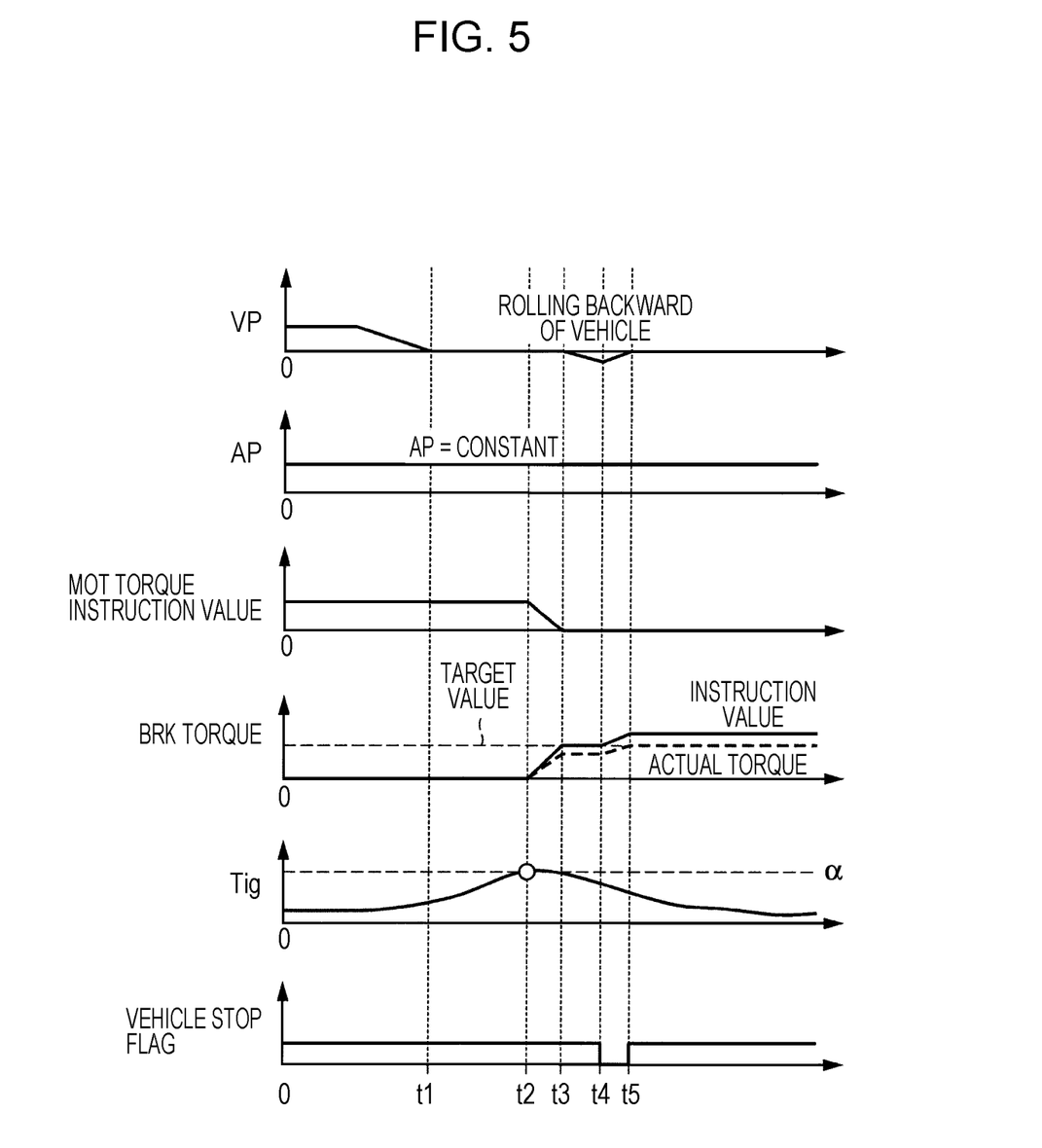
FIG. 5 is a timing diagram illustrating time-dependent changes in a motor torque instruction value and a brake torque instruction value according to a first exemplary embodiment.

FIG. 5 illustrates an example of a pattern indicating time-dependent changes in the motor torque instruction value and the brake torque instruction value determined through the above-described control process according to the first exemplary embodiment. In FIG. 5, the vehicle 1 is stopped on an uphill having a certain slope value by operating the brake pedal 14. Subsequently, at a time t1, the accelerator pedal is stepped on to the accelerator pedal position AP that is nearly constant. In this example, during a period of time from the time t1 to a time t3, the vehicle 1 is in a stall mode and is nearly stationary. In addition, during a period of time from the time t1 to a time t2, the inverter switching element temperature Tig is maintained at a temperature that is lower than the predetermined temperature α.

In such a case, during a period of time from the time t1 to a time immediately after the time t2, the driving force F is determined so as to be nearly constant through the process performed in step S08. Since the inverter switching element temperature Tig is still lower than the predetermined temperature α, the process for preventing an increase in the temperature of an inverter switching element is not started. Through the process performed in step S22, the torque target value of the electric motor 2 is determined. Consequently, as illustrated in the graph for a period of time prior to the time t2, the motor torque instruction value is maintained at such a value that the driving force of the vehicle 1 generated by the output torque of the electric motor 2 is the same as the driving force F.

In such a state, a relatively large electric current concentrically flows through one of the semiconductor switching elements 25 of the inverter circuit 24 of the motor PDU 22. Thus, the inverter switching element temperature Tig increases. At the time t2, the inverter switching element temperature Tig reaches the predetermined temperature α or higher.

As a result, the determination made in step S21 is "Yes", and the process for preventing an increase in the temperature of an inverter switching element is started. After the time t2, as illustrated in FIG. 5, the brake torque instruction value is gradually increased, and the motor torque instruction value is gradually decreased. The motor torque instruction value is decreased and the brake torque instruction value is increased so that the resultant combined force of the driving force of the vehicle 1 generated by the wheels 7 of the vehicle 1 when the output torque of the electric motor 2 is made equal to the motor torque instruction value and the total braking force of the brake system 10 for the vehicle 1 generated when the total braking force is made equal to the brake torque instruction value is the same as the driving force F determined in accordance with the accelerator pedal position AP. That is, a combination of the motor torque instruction value and the brake torque instruction value is determined so that the brake system 10 generates a braking force equivalent to the decrease in the motor torque instruction value.

Finally, the motor torque instruction value is decreased to "0" and is maintained at the value. Similarly, the brake torque instruction value is increased so that a braking force having a value that is the same as the driving force F is generated. Thereafter, the brake torque instruction value is maintained at a value that is the same as the driving force F until it is determined that the vehicle 1 is rolling backward in step S26. By decreasing the motor torque instruction value in the above-described manner through the process for preventing an increase in the temperature of an inverter switching element, an electric current flowing through the winding wire of the armature of the electric motor 2 decreases. Accordingly, as can be seen from the graph of FIG. 5, the inverter switching element temperature Tig decreases.

At that time, the actual brake torque (the actual torque) is slightly lower than the brake torque instruction value. Accordingly, the vehicle speed VP gradually decreases from the time t3 at which the motor torque instruction value is completely exchanged by the brake torque instruction value. At a time t4, it is determined that the vehicle 1 is rolling backward. That is, in step S26, it is determined that the vehicle speed VP<0. In steps S27 and S28, correction is performed so that the brake torque instruction value is increased. In this way, the brake torque instruction value is increased until the actual brake torque reaches the brake torque target value, that is, until the vehicle speed VP becomes "0". At a time t5, it is determined in step S29 that the vehicle speed VP is "0". Accordingly, the increase in the brake torque instruction value is stopped. From that point in time, the brake torque instruction value is maintained constant. Note that from the time t4 to the time t5, that is, during a period of time during which a vehicle stop flag indicates that the vehicle 1 is rolling backward, the brake torque instruction value is corrected.

Therefore, according to the first exemplary embodiment, the vehicle control apparatus determines that the vehicle 1 is in a stall mode. If the inverter switching element temperature Tig increases to a temperature that is higher than or equal to the predetermined temperature α and, therefore, the thermal load imposed on the semiconductor switching elements 25 increases, the output torque of the electric motor 2 is decreased. Accordingly, the load imposed on the semiconductor switching elements 25 can be reduced. In addition, since the brake torque of the brake system 10 can be increased by the brake torque equivalent to a decrease in the output torque of the electric motor 2, rolling backward of the vehicle 1 can be prevented. Furthermore, the actual brake torque may differ from the brake torque instruction value for the brake system 10 depending on the conditions of the brake system 10, such as the temperature of the brake pad, the friction coefficient of the pad, and the oil temperature. Even in such a case, since the brake torque of the brake system 10 is corrected so that the vehicle 1 stops rolling backward, the vehicle 1 can reliably remain stationary. As a result, the load imposed on the semiconductor switching elements 25 in a stall mode can be reduced. In addition, rolling backward of the vehicle 1 can be stably prevented regardless of the conditions of the brake system 10. Thus, the quality of the product can be increased.

Furthermore, the correction amount for correcting the brake torque instruction value is increased as the oil temperature of the brake system 10 increases, as the ambient temperature outside the vehicle 1 increases, or as the wear level of the brake pad of the brake system 10 increases. Thus, a decrease in the actual brake torque caused by these situations can be appropriately compensated for.

Figure 6:
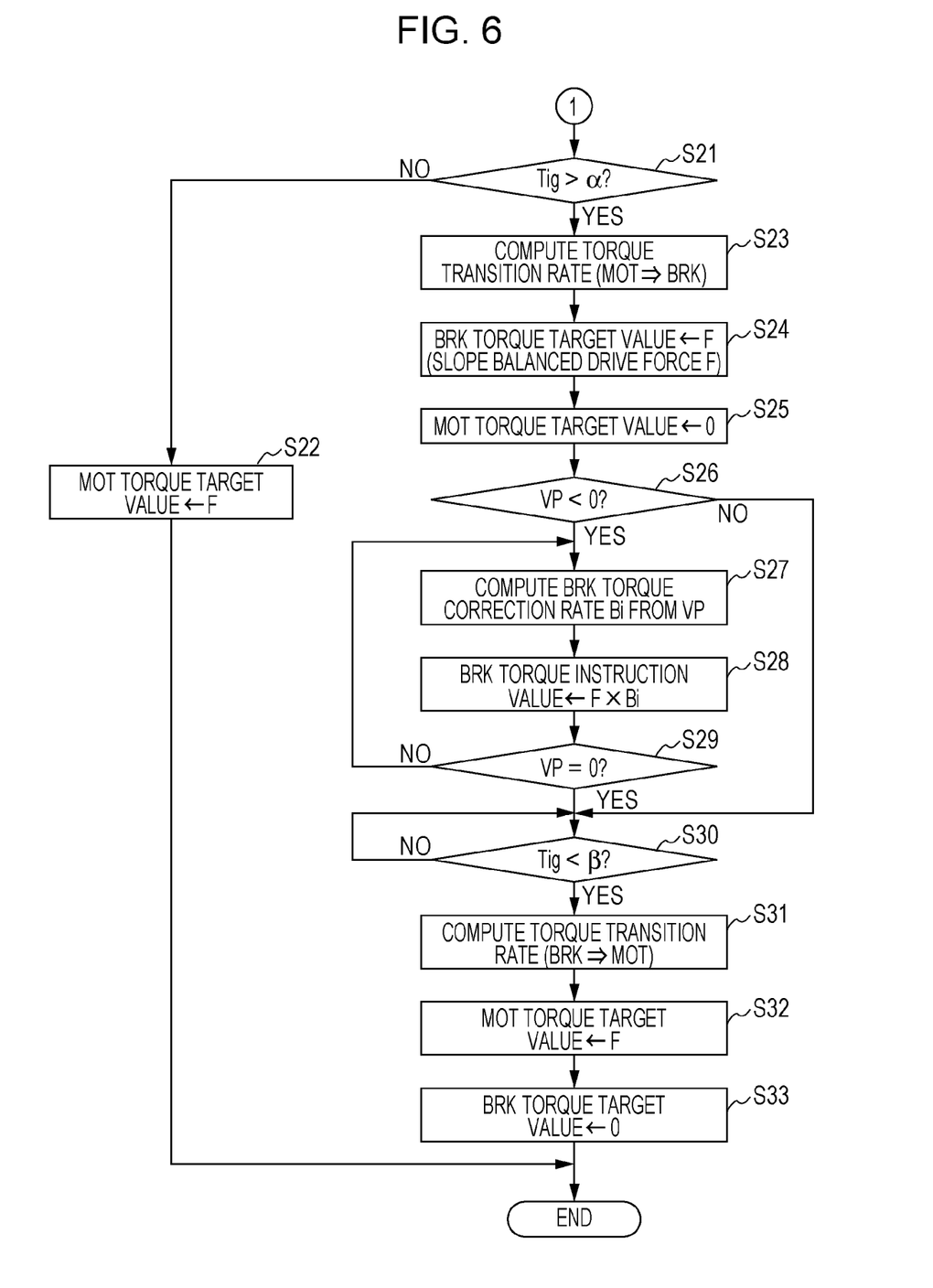
FIG. 6 is a flowchart corresponding to FIG. 4, according to a second exemplary embodiment.

A vehicle control apparatus according to a second exemplary embodiment of the technology is described next with reference to FIGS. 6 and 7 in addition to FIGS. 1 to 3. Note that the vehicle control apparatus according to the second exemplary embodiment performs a control process that is the same as the control process performed by the vehicle control apparatus according to the first exemplary embodiment and in addition performs a motor brake returning process. The same numbering will be used in describing a flowchart in FIGS. 6 and 7 as was utilized above in describing the flowchart in FIGS. 1 to 3, where appropriate, and only the motor brake returning process is described.

The processes from step S01 to step S09 in FIG. 3 are performed first. That is, the accelerator pedal position AP, the vehicle speed VP, the inverter switching element temperature Tig, and the brake fluid pressure PMCX are obtained, and it is determined whether the vehicle 1 is in a stall mode in which the vehicle speed VP is "0" and the accelerator pedal position AP is constant. Subsequently, as illustrated in FIG. 6, if, in step S21, it is determined that the inverter switching element temperature Tig is higher than the predetermined temperature α, the process for preventing an increase in the temperature of an inverter switching element (steps S23 to S25) is performed. That is, the motor torque instruction value that reduces the output torque of the electric motor 2 is generated. In addition, the brake torque instruction value that increases the braking force of the brake system 10 by a braking force equivalent to a decrease in the output torque of the electric motor 2 is generated.

If, in step S26, it is determined that the vehicle 1 is rolling backward (if VP<0), the brake torque instruction value is increased and corrected until the vehicle 1 stops rolling backward. More specifically, in step S27, the correction rate Bi is computed on the basis of the vehicle speed VP. In step S28, a correction value obtained by multiplying the correction rate Bi by the current brake torque instruction value is set as the brake torque instruction value. In step S29, it is determined whether the vehicle speed VP is "0". If the determination is "No" (if VP≠0), the processing returns to step S27. However, if the determination is "Yes" (if VP=0), the processing proceeds to step S30. Note that if, in step S26, it is determined that the vehicle 1 is not rolling backward (if VP≥0), the above-described correction process is not performed, and the processing proceeds to step S30.

In step S30, it is determined whether the detection value of the inverter switching element temperature Tig is lower than a predetermined temperature β. The temperature β is a preset temperature that is slightly lower than the predetermined temperature α used in step S21. If the determination is "No" (if Tig≥β), the determination made in step S30 is repeated until the detection value of the inverter switching element temperature Tig falls below the predetermined temperature β. If the determination is "Yes" (if Tig<β), the processing proceeds to step S31. Note that in step S31 and thereafter, a process for increasing the motor torque instruction value (i.e., returning the motor torque instruction value to the original value) and decreasing the brake torque instruction value is performed. The process is referred to as a "motor brake returning process".

Therefore, according to the second exemplary embodiment, the following motor brake returning process is performed. That is, after the inverter switching element temperature Tig rises above the predetermined temperature α, the brake torque instruction value is increased and, concurrently, the motor torque instruction value is decreased until the inverter switching element temperature Tig falls below the predetermined temperature β(<α).

In step S31, the torque transition rate for increasing the motor torque to be used in the motor brake returning process (from BRK to MOT) is computed. As used herein, the term "torque transition rate for increasing the motor torque" refers to a target incremental value in the motor torque instruction value per unit time or a target decremental value in the brake torque instruction value per unit time in the motor brake returning process.

In step S32, the torque target value of the electric motor (MOT) 2 is set to the driving force F. The motor torque instruction value is increased in accordance with the torque transition rate obtained in step S31. More specifically, the current motor torque instruction value is determined by adding a value obtained by multiplying the time of one cycle of the computational process by the torque transition rate (>0) for decreasing the braking force to the previous motor torque instruction value. Note that the current motor torque instruction value is limited so as not to exceed the driving force F of the vehicle 1.

In step S33, the brake (BRK) torque target value is set to "0", and the processing for the current computational cycle is completed. More specifically, the detection value of the brake fluid pressure PMCX is converted into its equivalent brake torque. Thus, an estimated value of the actual brake torque is obtained. Furthermore, the brake torque instruction value is determined from the estimated value of the brake torque and the current value of the driving force F so that the sum of the brake torque and the torque of the electric motor 2 is the same as the driving force F. Note that at that time, the brake torque instruction value is limited so that the current brake torque instruction value does not fall below "0".

In step S33, instead of the obtained brake torque, the motor torque instruction value determined in step S32 (the previous value or the current value) may be used to determine the brake torque instruction value. Alternatively, the brake torque instruction value may be determined so as to be decreased in accordance with a torque transition rate having the same absolute value as the torque transition rate determined in step S31 but the opposite sign (<0).

Figure 7:
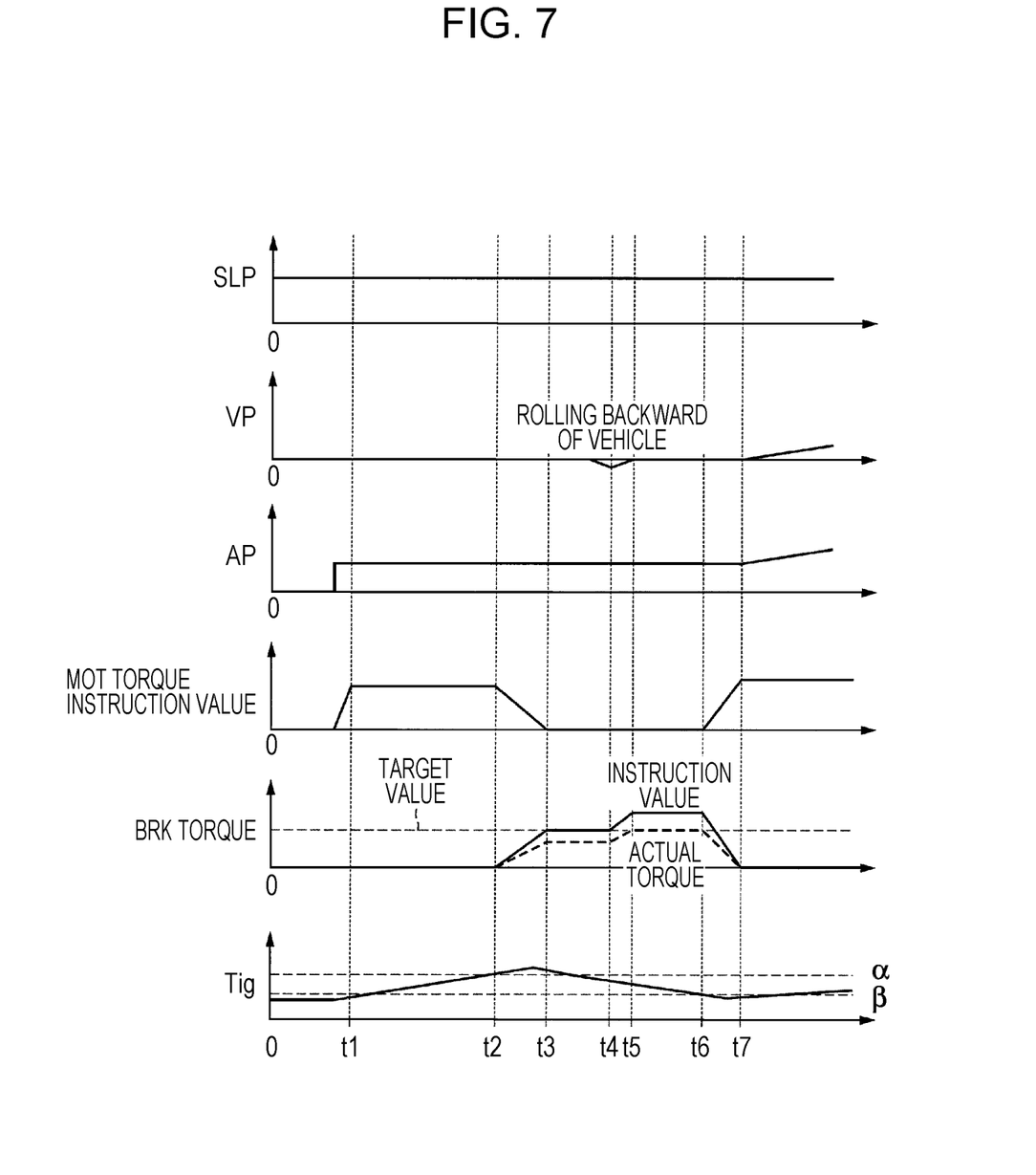
FIG. 7 is a timing diagram corresponding to FIG. 5, according to the second exemplary embodiment.

FIG. 7 illustrates an example of a pattern indicating time-dependent changes in the motor torque instruction value and the brake torque instruction value determined through the above-described control process according to the second exemplary embodiment. In FIG. 7, the vehicle 1 is stopped on an uphill having a certain slope by operating the brake pedal 14. Subsequently, at a time t1, the accelerator pedal is stepped on to the accelerator pedal position AP that is nearly constant. In this example, during a period of time from the time t1 to a time t3, the vehicle 1 is in a stall mode and is nearly stationary. In addition, during a period of time from the time t1 to a time t2, the inverter switching element temperature Tig is maintained at a temperature that is lower than the predetermined temperature α.

In such a case, during a period of time from the time t1 to a time immediately after the time t2, the driving force F is determined so as to be nearly constant through the process performed in step S08. Since the inverter switching element temperature Tig is still lower than the predetermined temperature α, the process for preventing an increase in the temperature of an inverter switching element is not started. Through the process performed in step S22, the torque target value of the electric motor 2 is determined. Consequently, as illustrated in the graph for a period of time before the time t2, the motor torque instruction value is maintained at such a value that the driving force of the vehicle 1 generated by the output torque of the electric motor 2 is the same as the driving force F.

In such a state, a relatively large electric current concentrically flows through one of the semiconductor switching elements 25 of the inverter circuit 24 of the motor PDU 22. Thus, the inverter switching element temperature Tig increases. At the time t2, the inverter switching element temperature Tig reaches the predetermined temperature α or higher.

As a result, the determination made in step S21 is "Yes", and the process for preventing an increase in the temperature of an inverter switching element is started. After the time t2, as illustrated in FIG. 7, the brake torque instruction value is gradually increased, and the motor torque instruction value is gradually decreased. In this case, the motor torque instruction value is decreased and the brake torque instruction value is increased so that the resultant combined force of the driving force of the vehicle 1 generated by the wheels 7 of the vehicle 1 when the output torque of the electric motor 2 is made equal to the motor torque instruction value and the total braking force of the brake system 10 for the vehicle 1 generated when the total braking force is made equal to the brake torque instruction value is the same as the driving force F determined in accordance with the accelerator pedal position AP. That is, a combination of the motor torque instruction value and the brake torque instruction value is determined so that the brake system 10 generates a braking force equivalent to the decrease in the motor torque instruction value.

Finally, the motor torque instruction value is decreased to "0" and is maintained at the value. Similarly, the brake torque instruction value is increased so that a braking force having a value that is the same as the driving force F is generated. Thereafter, the brake torque instruction value is maintained at a value that is the same as the driving force F until it is determined that the vehicle 1 is rolling backward in step S26.

At that time, the actual brake torque (the actual torque) is slightly lower than the brake torque instruction value. Accordingly, the vehicle speed VP gradually decreases from the time t3 at which the motor torque instruction value is completely exchanged by the brake torque instruction value. At a time t4, it is determined that the vehicle 1 is rolling backward. That is, in step S26, it is determined that the vehicle speed VP<0. In steps S27 and S28, correction is performed so that the brake torque instruction value is increased. In this way, the brake torque instruction value is increased until the actual brake torque reaches the brake torque target value, that is, until the vehicle speed VP becomes "0". At a time t5, it is determined in step S29 that the vehicle speed VP is "0". From that point in time, the brake torque instruction value is maintained constant.

By decreasing the motor torque instruction value in the above-described manner through the process for preventing an increase in the temperature of an inverter switching element, an electric current flowing through the winding wire of the armature of the electric motor 2 decreases. Accordingly, as can be seen from the graph of FIG. 7, the inverter switching element temperature Tig decreases. Thereafter, at a time t6, the inverter switching element temperature Tig falls below the predetermined temperature β.

At that time, since the determination made in step S30 is "Yes", the process for preventing an increase in the temperature of an inverter switching element is stopped, and the motor brake returning process is started. Accordingly, as can be seen from FIG. 7, after the time t6, the brake torque instruction value is gradually decreased, and the motor torque instruction value is gradually increased.

In addition, in such a case, like the process for preventing an increase in the temperature of an inverter switching element, the motor torque instruction value is increased and the brake torque instruction value is decreased so that the resultant combined force of the driving force of the vehicle 1 generated by the wheels 7 of the vehicle 1 when the output torque of the electric motor 2 is made equal to the motor torque instruction value and the total braking force of the brake system 10 for the vehicle 1 generated when the total braking force is made equal to the brake torque instruction value is the same as the target value (the driving force F of the vehicle 1 determined in accordance with the accelerator pedal position AP). That is, a combination of the motor torque instruction value and the brake torque instruction value is determined so that the electric motor 2 generates an output torque equivalent to the decrease in the brake torque instruction value.

In the motor brake returning process, the brake torque instruction value is finally decreased to "0". In addition, the motor torque instruction value is increased to such a value that the driving force of the vehicle 1 generated when the output torque of the electric motor 2 is made equal to the motor torque instruction value is the same as the driving force F of the vehicle 1 (i.e., a target value).

As described above, if the inverter switching element temperature Tig falls below the predetermined temperature β, the brake torque instruction value is decreased. In addition, the motor torque instruction value is increased. Thus, the mode returns to a mode before the process for preventing an increase in the temperature of an inverter switching element is started. Accordingly, at that time, if the driver further steps on the accelerator pedal in order to start the vehicle 1, the vehicle speed VP rapidly increases, as illustrated in FIG. 7. Thus, the vehicle 1 can smoothly start.

As a result, according to the second exemplary embodiment, an excessively high inverter switching element temperature Tig can be prevented. In addition, when the vehicle 1 is started, the number of occurrences in which the braking force generated by the brake system 10 is applied to the vehicle 1 is minimized and, therefore, the vehicle 1 can be smoothly started.

While the technology has been described with reference to the above exemplary embodiments, those skilled in the art will recognize that the technology can be practiced with modification within the spirit and scope of the technology. For example, while the above embodiments have been described with reference to the vehicle 1 having the engine 4 and the generator 3, the present technology is applicable to vehicles not having the engine 4 and the generator 3. In addition, while the above embodiments have been described with reference to the semiconductor switching elements 25 formed from IGBTs, the present technology is applicable to any switching element in addition to an IGBT.

According to an embodiment of the present technology, a vehicle control apparatus includes an electric motor (e.g., an electric motor 2 according to an exemplary embodiment) configured to serve as a source of driving power in a vehicle (e.g., a vehicle 1 according to an exemplary embodiment), a source power supply circuit (e.g., a motor PDU 22 according to an exemplary embodiment) configured to supply source power to the electric motor, an electric motor control unit (e.g., a motor ECU 31 according to an exemplary embodiment) configured to control the electric motor via the source power supply circuit in accordance with a motor torque instruction value serving as an instruction value that determines an output torque of the electric motor, a brake system (e.g., a brake system 10 according to an exemplary embodiment) configured to generate a braking force that mechanically decelerates a wheel (e.g., a wheel 7 according to an exemplary embodiment) of the vehicle, a brake control unit (e.g., a brake ECU 34 according to an exemplary embodiment) configured to control the braking force generated by the brake system in accordance with a brake torque instruction value serving as an instruction value that determines the braking force, a stall determination unit (e.g., steps S06 and S07 according to an exemplary embodiment) configured to determine whether the vehicle is in a stall mode in which the vehicle is stationary although the output torque that is output from the electric motor and that functions as a driving force for the vehicle is being transferred to a drive wheel of the vehicle, a temperature detecting unit (e.g., step S03 according to an exemplary embodiment) configured to detect a temperature of the source power supply circuit, and a backward-rolling detecting unit (e.g., step S26 according to an exemplary embodiment) configured to detect whether the vehicle is rolling backward. When the stall determination unit determines that the vehicle is in a stall mode and if the temperature of the source power supply circuit detected by the temperature detecting unit increases to a predetermined value (e.g., a predetermined temperature α according to an exemplary embodiment) or higher, the motor torque instruction value is generated so that the output torque of the electric motor is decreased and the brake torque instruction value is generated so that the braking force of the brake system is increased by a braking force that is equivalent to a decrease in the output torque of the electric motor. If rolling backward of the vehicle is detected by the backward-rolling detecting unit while the brake torque instruction value is being generated, the brake torque instruction value is corrected so that the vehicle stops rolling backward. According to the embodiment, when it is determined the vehicle is in a stall mode and if the temperature of the source power supply circuit is increased to a predetermined value or higher and, therefore, the thermal load imposed on the source power supply circuit is increased, the output torque of the electric motor is decreased. Thus, the load imposed on the source power supply circuit can be decreased. In addition, since the braking force generated by the brake system can be increased by a braking force that is equivalent to a decrease in the output torque of the electric motor, rolling backward of the vehicle can be prevented. Furthermore, if the actual braking force differs from the brake torque instruction value depending on the conditions of the brake system, such as the temperature of a brake pad, the friction coefficient of the pad, and the oil temperature, the braking force of the brake system can be corrected so that the vehicle stops rolling backward. Thus, the vehicle can reliably remain stationary. As a result, the load imposed on the source power supply circuit in a stall mode can be reduced. In addition, rolling backward of the vehicle can be stably prevented regardless of the conditions of the brake system. Thus, the quality of the product can be increased.

The vehicle control apparatus can further include an oil temperature detecting unit (e.g., an oil temperature sensor S1 according to an exemplary embodiment) configured to detect an oil temperature of the brake system. A correction amount for correcting the brake torque instruction value can be increased with an increase in the oil temperature of the brake system detected by the oil temperature detecting unit. In this way, if the oil temperature increases and, therefore, the actual braking force decreases from the brake torque instruction value, the decrease can be appropriately corrected.

The vehicle control apparatus can further include an ambient temperature detecting unit configured to detect an ambient temperature outside the vehicle (e.g., an ambient temperature sensor S2 according to an exemplary embodiment). A correction amount for correcting the brake torque instruction value can be increased with an increase in the ambient temperature detected by the ambient temperature detecting unit. In this way, if, for example, the temperature of the pad of the brake system is increased due to an increase in the ambient temperature and, therefore, the actual braking force decreases from the brake torque instruction value, the decrease can be appropriately corrected.

The vehicle control apparatus can further include a wear level determination unit (e.g., a brake ECU 34 according to an exemplary embodiment) configured to detect the level of wear of a pad of the brake system. A correction amount for correcting the brake torque instruction value can be increased with an increase in the level of wear of the pad detected by the wear level determination unit. In this way, even when the friction coefficient of the pad of the brake system is decreased with an increase in the wear level of the pad and, therefore, the actual braking force decreases from the brake torque instruction value, the decrease can be appropriately corrected.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle control system comprising:
   an electric motor configured to generate a driving force in a vehicle;
   a source power supply circuit configured to supply electric power to the electric motor;
   an electric motor controller configured to control an output torque of the electric motor via the source power supply circuit in accordance with a motor torque instruction value;
   a brake device configured to generate a braking force that mechanically decelerates a wheel of the vehicle;
   a brake controller configured to control the braking force generated by the brake device in accordance with a brake torque instruction;
   a stall determination device configured to determine whether the vehicle is in a stall mode in which the vehicle is stationary although the driving force generated by the electric motor is being transferred to a drive wheel of the vehicle;
   a temperature detector configured to detect a temperature of the source power supply circuit, the motor torque instruction value being generated so that the output torque of the electric motor is decreased and the brake torque instruction value being generated so that the braking force generated by the brake device is increased by a braking force that is substantially equivalent to a decrease in the output torque of the electric motor, if the stall determination device determines that the vehicle is in the stall mode and if the temperature of the source power supply circuit detected by the temperature detector is higher than a predetermined value; and
   a backward-rolling detector configured to detect whether the vehicle is rolling backward, the brake torque instruction value being corrected so that the vehicle stops rolling backward if rolling backward of the vehicle is detected by the backward-rolling detector while the brake torque instruction value is being generated.

2. The vehicle control system according to claim 1, further comprising:
   an oil temperature detector configured to detect an oil temperature of the brake device, wherein a correction amount for correcting the brake torque instruction value is increased with an increase in the oil temperature of the brake device detected by the oil temperature detector.

3. The vehicle control system according to claim 1, further comprising:

an ambient temperature detector configured to detect an ambient temperature outside the vehicle, wherein a correction amount for correcting the brake torque instruction value is increased with an increase in the ambient temperature detected by the ambient temperature detector.

4. The vehicle control system according to claim 1, further comprising:

a wear level determination device configured to detect a level of wear of a pad of the brake device, wherein a correction amount for correcting the brake torque instruction value is increased with an increase in the level of wear of the pad detected by the wear level determination device.

5. The vehicle control system according to claim 1, further comprising:

a first controller configured to generate the motor torque instruction value; and a second controller configured to generate the brake torque instruction value, wherein if rolling backward of the vehicle is detected by the backward-rolling detector while the brake torque instruction value is being generated, the second controller is configured to correct the brake torque instruction value so that the vehicle stops rolling backward.

* * * * *